United States Patent [19]

Hebbar et al.

[11] 4,158,563
[45] Jun. 19, 1979

[54] LOW ANTIMONIAL LEAD ALLOY FOR MAKING GRIDS FOR USE IN MAINTENANCE FREE BATTERIES

[75] Inventors: Ranna K. Hebbar, Roosevelt; M. Vikram Rao, Princeton Junction; George S. Foerster, Hightstown, all of N.J.

[73] Assignee: N L Industries, Inc., New York, N.Y.

[21] Appl. No.: 840,830

[22] Filed: Oct. 11, 1977

[51] Int. Cl.² ............................................. C22F 11/10
[52] U.S. Cl. .................................. 75/166 C; 429/226
[58] Field of Search ............... 429/245, 226; 75/166 C

[56] References Cited

U.S. PATENT DOCUMENTS 3,993,480  11/1976  Ueberschaer et al. ............. 75/166 C Primary Examiner—M. J. Andrews
Attorney, Agent, or Firm—Gerald K. White; Malcolm L. Sutherland

[57] ABSTRACT

An electric storage battery grid made from an improved low antimonial content lead alloy is disclosed. The battery grid can be used to manufacture maintenance free lead acid storage batteries. The alloy has an improved combination of low gassing rate and hardness, castability and pasteability and contains less than 2.0%, i.e. approximately 1.3 to 1.9 weight percent antimony, 0.05 to 0.45 percent arsenic and 0.02 to 0.5 weight percent tin as well as small amounts of copper and sulfur.

7 Claims, No Drawings

LOW ANTIMONIAL LEAD ALLOY FOR MAKING GRIDS FOR USE IN MAINTENANCE FREE BATTERIES

The present invention relates to an improved low antimony lead alloy for use in the manufacture of grids for use in maintenance-free electric acid storage batteries.

BACKGROUND OF THE INVENTION

Antimonial alloys used in the manufacture of grids for use in automotive batteries have, in recent years, shown a trend toward the use of lower antimonial contents. Antimony is primarily used to impart strength to the alloys for handling soon after the grid is cast and in the pasting operations. Today, grids only 50 mils thick are being cast and antimony levels have dropped from the historical 11% to as low as 2.5 to 3.0%. A direct consequence of this development has been remarkable improvement in the overall performance of the lead acid battery including significant reduction in the water loss in such batteries. However, it has heretofore been believed that alloys containing less than 2.5% antimony would present several problems, specifically in terms of castability and adequacy of strength for subsequent handling, and offer no reduction in gas casting.

A number of patents, see U.S. Pat. Nos. 3,801,310; 3,912,537; 3,990,893; 3,993,480; etc. have described the use of low antimony levels in alloys designed for battery grid production. These patents recognize the desirability of a low antimony lead alloy; however, the softness and lack of castability due to the low antimony content has heretofore been compensated for by the addition of other elements such as selenium and silver, to improve these properties. U.S. Pat. No. 3,993,480 describes an alloy containing 0.5 to 3.5% antimony with quantities of arsenic, tin, silver, copper, selenium and sulfur. U.S. Pat. No. 3,801,310, for example, describes an alloy containing 1 to 3.5% antimony and additional quantities of arsenic, tin, selenium and silver. The alloys of this patent containing below 2% antimony are described as obtaining adequate hardness only by resorting to water spraying, a procedure that is commercially impractical. Lead alloys containing less than about 2.5% antimony have not been produced commercially, however, because no significant decrease in gassing has heretofore been found with such alloys and such low antimony alloys have still had inadequate hardness. Poor castability, inadequate corrosion resistance, and excessive grid growth have also been problems experienced when using such alloys.

In contrast to the prior art, it has now been found that lead alloys containing low amounts of antimony, e.g. about 1.3 to 2.0% antimony, and specific amounts of arsenic, tin, copper and sulfur have a surprisingly good combination of properties. These properties included good castability, adequate hardness for easy handling and pasting, improved water loss characteristics, good corrosion resistance and good grid growth behavior, high cold crank and reserve capacity, and improved shelf life. Therefore, in accordance with this invention, by producing the alloy with controlled limits of antimony, arsenic and tin concentrations, in addition to the other elements mentioned, a low antimonial lead alloy is produced which has sufficient hardness, good castability and pasteability for use in producing battery grids. Further, the grids in accordance with this invention can be used to produce a maintenance free battery, i.e. one in which water loss or "gassing" is acceptably low. Additional advantages of this new alloy are excellent corrosion resistance, good grid growth characteristics, and low drossing rate.

SUMMARY OF THE INVENTION

In accordance with this invention, these advantages are obtained with a lead alloy which contains less than about 2.0%, i.e. about 1.3 to about 1.9% antimony, 0.05 to 0.45% arsenic, and 0.02 to 0.5% tin. All percentages expressed herein are by weight. This antimony content provides adequate hardness and a gassing rate approximately half that of the low antimony lead alloys now used commercially which permits the alloy to be used in long life, maintenance free batteries. The arsenic contributes importantly to hardness, particularly just after casting, which permits the grids to be readily handled upon casting. Additionally, the alloy of this invention contains about 0.02 to 0.09% copper and about 0.003 to 0.012% weight sulfur to provide a fine grain size and good castability. In general, the higher end of these ranges are preferred when casting thin grids. Lead alloys containing about 1.3% weight antimony have the minimum hardness necessary for handling after casting and pasting. Below this level of antimony, the hardness is inadequate. Similarly, it has been found that above 2.0 weight percent antimony the water loss increases rapidly.

DETAILED DESCRIPTION OF THE INVENTION

The principal properties required for an alloy to be used in making battery cell grids are mechanical strength, castability, corrosion resistance and low gassing. The grid should be capable of withstanding handling and the stresses encountered during pasting. The alloy should be easily castable as indicated by high casting rates and low reject percentages. Resistance to corrosion in service is also required. Low gassing rates are critical since these lead to little or no water addition during the guaranteed lifetime of the battery. These properties are achieved in the alloy of this invention by the proper selection of the alloy constituents and the amount of each included in the alloy.

The strength of high antimonial lead alloys is obtained by a dispersion of the eutectic (antimony rich) phase. The quantity of this phase decreases in lower antimonial lead alloys. For example, a 4% Sb alloy will have approximately 15% eutectic material, whereas 3% and 2% Sb alloys, respectively, have only 11% and 5%. Thus, the lower Sb alloys do not have enough eutectic material to strengthen them adequately.

Low antimony lead alloys therefore, must be hardened by the process of particulates strengthening. The principle involves creating a dispersion of hard particles throughout the matrix to impede the progress of the deformation front. The particles can be produced either during the solidification process (dispersion hardening) in which case the particles are relatively large and provide their hardening action immediately in the "as cast" stage, or after solidification (precipitation hardening). This latter is described as an "aging" mechanism because the particles "precipitate" out of the solid phase over a period of time. The particles are fine, but have large spheres of influence, and are therefore, very effective. However, the hardening is a function of time after casting, and the exact nature of this aging behavior depends upon alloy composition. In the alloy of this invention arsenic produces dispersion hardening and antimony contributes to precipitation hardening.

In general, it is desired that a sufficient amount of antimony be included in the lead alloy of the present invention to provide for a hardness adequate for conventional handling immediately after casting. After only one day natural aging, the antimonial lead alloys of this invention containing about 2% antimony can be readily pasted mechanically or manually. Such alloys containing as low as 1.4% antimony can be pasted after aging for about one week.

The hardness required for pastability is also influenced by the type of pasting machine as well as the thickness of the grid being pasted. The Barber-Coleman (B-C) Impressor (Model GYZ-J, No. 936) can be utilized to arrive at the lower limits of hardness required at any given manufacturing facility. In general, it has been found that an alloy hardness of about 76 B-C units or higher, is is satisfactory for a vertical orifice machine and that hardness of about 78 B-C units is desired for a belt paster when pasting grids of a typical size such as grid 53 mils thick having wires about 30 mils in diameter and an average weight about 52 grams.

The loss of water in a battery during its normal use is an important parameter that has to be considered in the development of improved acid storage battery systems for maintenance-free applications. The total water loss in a battery can be attributed to two major factors, namely evaporation and electrolysis. The evaporative component is a function of temperature, time, humidity of the enviromnent and the battery case and vent designs. The electrolytic component (the dissociation of water due to electrolysis) is a function of the grid alloy, temperature, total miles driven and driving pattern. The present invention is concerned with the water loss due to electrolysis (known as "gassing") because the evaporative component is common to all systems.

The phenomenon of "gassing" occurs when a battery is on charge, as is the case when an automobile is running, and the antimony present in the positive plates leaches into the electrolyte and is transferred through the separators to the negative plates. The electrochemical nature of the antimonial ions facilitates their deposition on the negative plates. The presence of antimony on the negative plates increases the propensity for hydrogen gas evolution. The gas is evolved by the dissociation of water molecules present in the electrolyte, resulting in a net water loss.

Gassing rates of a battery are expressed as cubic centimeters of gas evolved per minute per cell at an operating temperature of 80° F. and 14.1 V. In accordance with this invention it has been found that the gassing rate of a battery drops off sharply as the antimony content of the alloy used to produce the battery grids decreases to an antimony level of around 2%. Below this region, the gassing rate levels off. Thus, a reduction of the antimony content of the alloy below about 1.8–2% does not contribute significantly to reduced water loss in the battery. Batteries produced using alloys having about 1.8% Sb, for example experience a water loss about 50% lower than batteries produced using alloys containing 2.75% Sb and over 80% lower than batteries produced using alloys containing 4% Sb, in newly constructed batteries after the normal initial cycles. In general, it is desired for the alloy of this invention to contain an amount of antimony effective to provide for a gassing rate of less than about 0.06 cc/min/cell, preferably less than about 0.055 cc/min cell, in new batteries produced using grids of the alloy.

Surprising, in accordance with this invention, it has been found that at antimony levels in the alloy of below 2.0%, typically about 1.3 to about 1.9%, preferably about 1.6% to 1.8%, both the desired hardness of the alloy and water loss properties of the battery are achieved.

Arsenic is added to the alloy of the present invention to improve the cast hardness in order to be able to satisfactorily handle the grids immediately following casting. In general, the alloy of the present invention, contains about 0.05 to 0.45%, preferably above 0.1%, about 0.15% to 0.25% arsenic. Although increasing the arsenic content above 0.05% provides an improvement in cast hardness, it has been found that the increase in hardness provided by amounts of arsenic above about 0.2% is small and in many alloys unnecessary to reach the desired minimum cast hardness. Further, the water loss increases in batteries produced using alloys having arsenic contents above about 0.25%. This affect is more pronounced at the lowest antimony levels.

In the present invention, arsenic does not appear to materially effect the aging behavior of the cast grid. The castability of the lead alloys of the present invention is comparable to that of commercial lead alloys containing high antimony levels and superior to that of the commercially available antimony-free alloys, such as lead-calcium and lead-strontium alloys, now used for maintenance free batteries.

Tin is also included in the alloy of the present invention to improve the fluidity of the metal, thereby improving castability. In general, above about 0.02% tin can be used although more typically about 0.1 to 0.5% tin is included in the alloy. Preferably, only that amount of tin required to provide the desired castability is incorporated in the alloy. The amount of tin in the alloy should be approximately the same as the amount of arsenic, or slightly higher. If, however, substantially larger amounts of tin than arsenic are used, filament formation can occur in casting. The preferred range is typically 0.1% or 0.15% to 0.3% tin. Below about 0.1% tin in the alloy there is a definite drop in the castability of the alloy.

Sulfur and copper are added to the alloy of this invention as grain refiners, with sulfur providing the refinement due to the formation of lead sulfide nuclei at the inception of solidification. Copper provides supportive action in modifying the solubility of sulfur and therefore controlling the instant at which the nuclei begin to appear. In the absence of such nuclei freezing of the alloy will first occur on the cool walls of the mold, thus producing a columnar structure. Columnar structure is not desired because it leads to poor castability due to poor metal flow to those portions of the casting mold last to freeze and to non-uniform distribution of antimony, which contributes to increased gassing rates. Proper selection of the grain refining material and the amount used is very important since formation of the nucleating particles too early or too late in the solidification process renders them ineffective. Selection of the grain refiners and the amount used is particularly critical when casting extremely thin battery grids such as those with 28 mil wires. Particularly at low antimony levels in the lead alloy of the present invention, and when manufacturing thin grids, the sulfur concentration assumes greater importance.

Hot cracking of the alloy is a result of poor castability and columnar structure. In general, a sufficient amount of sulfur is added to the alloy to achieve good casting and avoid hot cracking of the alloy. As mentioned, the specific amount of sulfur is related to the size of the grids. For example, an alloy containing about 0.004% sulfur exhibited poor casting behavior with severe hot cracking when used to produce grids having wires 28 mil thick and grid weights averaging 45 grams. Additions of sulfur to about 0.007% eliminated the hot cracking. By contrast, the original alloy exhibited no difficulty when casting grids with wire thicknesses of 33 mils and average weights of 52 grams. Typically, the sulfur is added in amounts of about 0.002%, or 0.004% to about 0.012%, or slightly higher, and preferably in amounts of about 0.007% to about 0.012%. Copper is typically added in an amount of about 0.02% to 0.09% of the alloy, preferably about 0.04% to 0.07%.

In summary, the low antimonial lead alloys of the present invention combine the advantages of commercial high antimonial lead alloys of hardness, ready produceability and low cost with many of the advantages of a antimony-free alloys (e.g., lead-calcium alloy and lead strontium alloy) of low gassing. Low gassing permits the alloys of this invention to be used in many maintenance free applications currently using antimony free alloys without significantly increasing the cost of the usage.

The alloys of the present invention achieve these desirable properties by proper selection of the constituents and the amount of each. The alloy contains less than 2.0%, typically about 1.3 to 1.9%, preferably about 1.6 to 1.8%, antimony; about 0.05% to 0.45%, preferably about 0.15% to 0.25%, arsenic; about 0.02% or 0.1% to 0.5%, preferably 0.10% or 0.15%, to 0.3% tin; about 0.02% to 0.09%, preferably 0.04% to 0.07%, copper; and about 0.002% or 0.004% to 0.012%, preferably 0.007% to 0.012% sulfur.

The following examples serve to further illustrate this invention. In these examples the alloys had the antimony, arsenic, sulfur, copper and tin levels shown with the balance being lead.

EXAMPLE 1

Effect of arsenic on as cast hardness.

A 2000 lb. batch of lead containing 1.75% Sb, 0.03% Sn, 0.05% As, 0.04% Cu and 0.005% S was melted in a pot. The tin was held at the low concentration of 0.03% so that the effect of arsenic could be quantified without interference from the tin. Automotive grids, 53 mils thick having 33 mil diameter wires and weighing 104 g per twin on the average, were cast on a Wirtz industrial grid casting machine. The casting rate was held constant at 16 twins per minute. The mold used for the grid casting tests was water cooled and had external heaters for temperature control.

The grid casting parameters were:
Lead Pot Temp. 800° F.
Feed Line 900° F.
Ladle 850°–900° F.
Mold Gate 280° F.
Upper Mold 310° F.
Lower Mold 380° F.
Casting Rate 16 twins/min.

The grids cast during this test were tested for "as cast" hardness by using a hand operated hardness impressor.

After casting grids at the above compositions, 0.05% increments were made in the arsenic content of the alloy from 0.05% to 0.20% and additional grids were cast under casting conditions identical to the first batch. Hardness measurements were made. The data set forth in Table 1 demonstrate that the hardness shows a substantial increase up to 0.15% As above 0.15%. As, the increase in hardness becomes less significant.

TABLE 1

| | Effect of Arsenic on Hardness |
|---|---|
| % As | "As Cast" Hardness, B-C units (Barber-Colman, Impressor Scale) |
| 0.05 | 70 |
| 0.10 | 71 |
| 0.15 | 73.5 |
| 0.20 | 74.0 |

EXAMPLE 2

Effect of tin on grid castability.

A 2500 lb. batch of lead alloy containing 1.75% Sb and 0.15% As was melted in a lead pot and grids were cast on a commercial grid caster at the rate of 16 twins per minute, as described in Example 1. The molds were oversprayed with cork in order to increase the difficulty of casting so that differences in castabilities at varying tin concentrations could be quantified. The grids cast during this test weighed 92 g per turn on an average as compared to the specified weight of 104 g per twin for the mold, and the grids had wire diameters of about 31 mil. The tin content in the alloy was varied in step increments of 0.05%. As the data set forth in Table 2 demonstrate, the castability improved from 75% to 85% when the tin content was increased from 0.1% to 0.15%. Castability is the percentage of the grids produced which are acceptable for battery production.

TABLE 2

| Table of % Sn vs. Castability | |
|---|---|
| % | Castability |
| 0.10 | 75% |
| 0.15 | 86% |
| 0.20 | 85% |

Above 0.15% the castability was not significantly improved and at tin contents above 0.25%, filament formation was observed.

EXAMPLE 3

A 3,000 lb. batch of alloy containing 1.9% Sb, 0.18% As, 0.25% Sn, 0.04% Cu and 0.002% S was cast as in Example 1. The grids obtained were unacceptable because of hot cracking. The grids cast had a frame thickness of 53 mil and wire diameter of 33 mil. When the same batch of metal, but with 0.005% S was cast acceptable grids were produced; however, with 29 mil diameter wires hot cracking occurred with this alloy. When the sulfur was then increased to 0.007%, acceptable grids were cast with wire diameters of 29 mil and 33 mil.

EXAMPLE 4

Effect of antimony content on the gassing rate. 53 mil grids were cast from lead alloys containing nominal compositions of 1%, 1.25%, 1.5%, 1.75%, 2.00% 2.75% and 4% antimony. The casting conditions, the same as in Example 1, were held constant to ensure uniformity in the grid structure. The grids were pasted with lead oxide to obtain positive plates and with lead oxide and a commercial expander to obtain negative plates. The oxide and expander formulations and the pasting techniques were identical to industry accepted practice. Three cells were constructed from each alloy. The cells were made up of five positive plates and six negative plates. The separator was a combination of a "daramic" separator and a glass matte. The glass matte was placed next to the positive plates in order to minimize shedding of the active material during the test. The positive plates were further wrapped with a glass fiber slyver in order to further reduce loss of capacity due to shedding. These plates were immersed in cells containing sulfuric acid and then formed and conditioned. The charged cells were then subjected to three initial cycles which consisted of a cold crank and a reserve capacity discharge followed by a second cold crank to develop the full capacity of each cell.

The cells so produced were subjected to a gassing test which consists of connecting all the cells in series and charging them at constant currents. The current is varied in increments from about 20 ma to about 2000 ma. At each current value the positive plate and negative plate reference potentials vs. a Hg/Hg SO$_4$ reference electrode, and the cell voltages are measured. These data are used to generate the "Tafel" curve and from this curve the hydrogen gassing current, which is directly responsible for gassing (or water loss), is determined. By stoichiometry, a charging current of 1 ampere is equivalent to 10.4 cc of gas/minute/cell.

Table 3 provides the gassing rate for the cells at the different antimony contents of the alloys used to produce the cells. It is seen that below 1.8% Sb there was no significant improvement in the gassing rate.

TABLE 3

| %Sb %Sb | Gassing Rate cc/min/cell at 80% ° F. & 2.35 V/cell |
|---|---|
| 0.80 | 0.053 |
| 1.10 | 0.054 |
| 1.35 | 0.055 |
| 1.66 | 0.056 |
| 1.80 | 0.057 |
| 2.50 | 0.081 |
| 3.80 | 0.187 |

Below 1.8% Sb the hardness, obtained as described in Example 1, also decreases. Alloys containing above 1.3% Sb have an adequate hardness.

| | HARDNESS vs. % Sb | |
|---|---|---|
| % Sb Actual | 3 Day Hardness B.C. Scale | 14 Day Hardness B.C. Impressor Scale |
| 0.8 | 70 | 72 |
| 1.0 | 71 | 73 |
| 1.25 | 73 | 74.5 |
| 1.5 | 75 | 78.5 |
| 1.75 | 78.5 | 80.5 |
| 2.0 | 80 | 82 |
| 2.25 | 81 | 83 |
| 2.5 | 82 | 84 |
| 3.0 | 83 | 85 |
| 3.8 | 85 | 87 |

EXAMPLE 5

An automotive lead acid battery consisting of six identical cells, as described in Example 4, connected in series and contained in a case made of hard rubber is constructed and filed with H$_2$SO$_4$ electrolyte. This battery exhibits maintenance-free characteristics.

It is claimed:

1. A lead alloy in the cast condition consisting essentially of 1.3 to less than 2.0 weight percent antimony, 0.05 to 0.45 weight percent arsenic, 0.1 to 0.5 weight percent tin, 0.02 to 0.09 weight percent copper, 0.002 to 0.012 weight percent sulfur, balance lead.

2. The lead alloy of claim 1, wherein:
said alloy is cast into the form of a battery grid having a hardness of at least about 76 B-C units and a gassing rate of less than 0.06 cc/min/cell.

3. The lead alloy of claim 1, wherein:
said alloy contains 1.6 to 1.8 weight percent antimony.

4. The lead alloy of claim 1, wherein:
said alloy contains 0.15 to 0.3 weight percent arsenic.

5. The lead alloy of claim 1, wherein:
said alloy contains 0.15 to 0.3 weight percent tin.

6. The lead alloy of claim 4, wherein:
said alloy contains tin in an amount of approximately the same as the amount of arsenic.

7. The lead alloy of claim 1, wherein:
said alloy contains 1.6 to 1.9 weight percent antimony, 0.15 to 0.25 weight percent arsenic, 0.15 to 0.3 weight percent tin, 0.04 to 0.07 weight percent copper, and 0.004 to 0.012 weight percent sulfur.

* * * * *

UNITED STATES PATENT OFFICE
CERTIFICATE OF CORRECTION

Patent No. 4,158,563                Dated   June 19, 1979

Inventor(s)   R. K. Hebbar, M. V. Rao, G. S. Foerster

It is certified that error appears in the above-identified patent and that said Letters Patent are hereby corrected as shown below:

Claim 7, line 46 - "1.9" should read -- 1.8 --.

Signed and Sealed this

Second Day of October 1979

[SEAL]

Attest:

RUTH C. MASON
*Attesting Officer*

LUTRELLE F. PARKER
*Acting Commissioner of Patents and Trademarks*